(12) United States Patent
Oda et al.

(10) Patent No.: US 7,639,603 B2
(45) Date of Patent: Dec. 29, 2009

(54) METHOD AND APPARATUS FOR SETTING UP BACKUP PATH

(75) Inventors: Masaya Oda, Yokohama (JP); Shinya Kano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 449 days.

(21) Appl. No.: 10/947,411

(22) Filed: Sep. 22, 2004

(65) Prior Publication Data

US 2005/0207337 A1     Sep. 22, 2005

(30) Foreign Application Priority Data

Mar. 22, 2004  (JP) ............... 2004-083272

(51) Int. Cl.
*G01R 31/08* (2006.01)
(52) U.S. Cl. .................... 370/218; 370/395.2
(58) Field of Classification Search ......... 370/216–218, 370/221–228, 230, 231, 235, 237, 395.2; 709/239
See application file for complete search history.

(56) References Cited

U.S. PATENT DOCUMENTS

| | | | |
|---|---|---|---|
| 6,324,162 B1 * | 11/2001 | Chaudhuri | 370/225 |
| 6,744,727 B2 * | 6/2004 | Liu et al. | 370/228 |
| 6,785,473 B1 | 8/2004 | Sasaki et al. | |
| 6,978,394 B1 * | 12/2005 | Charny et al. | 714/4 |
| 7,095,712 B2 | 8/2006 | Kinoshita et al. | |
| 7,120,151 B1 * | 10/2006 | Ginjpalli et al. | 370/395.1 |
| 7,206,281 B2 * | 4/2007 | Chen et al. | 370/222 |
| 7,372,806 B2 | 5/2008 | Suemura | |
| 7,471,625 B2 | 12/2008 | Suemura | |
| 2002/0167898 A1 * | 11/2002 | Thang et al. | 370/216 |
| 2002/0172149 A1 * | 11/2002 | Kinoshita et al. | 370/216 |
| 2003/0048749 A1 * | 3/2003 | Stamatelakis et al. | 370/225 |
| 2003/0095500 A1 * | 5/2003 | Cao | 370/216 |
| 2004/0042402 A1 * | 3/2004 | Galand et al. | 370/237 |

FOREIGN PATENT DOCUMENTS

| | | | |
|---|---|---|---|
| EP | 1318648 A2 * | 6/2003 | |
| JP | 2000-307620 | 11/2000 | |
| JP | 2000-324167 | 11/2000 | |
| JP | 2001-186178 | 7/2001 | |
| JP | 2002-344491 | 11/2002 | |
| JP | 2003-032289 | 1/2003 | |
| JP | 2003-143145 | 5/2003 | |

OTHER PUBLICATIONS

Huang, Changcheng et al., "A Path Protection/Restoration Mechanism for MPLS Networks," IETF Draft Multi-Protocol Label Switching <draft-chang-mpls-path-protection-01.txt>, Jul. 2000. pp. 1-23.*
Japanese Office Action dated May 19, 2009, from the corresponding Japanese Application.

* cited by examiner

*Primary Examiner*—Donald L Mills
(74) *Attorney, Agent, or Firm*—Katten Muchin Rosenman LLP

(57) ABSTRACT

A method of setting up a backup path for a primary path on a network includes the steps of grouping nodes constituting the primary path into segments each including a plurality of nodes, and setting a backup path connecting between a head node and end node of each of the segments separately for each segment by notifying of information about segment position by a primary-path-provision requesting message.

7 Claims, 12 Drawing Sheets

FIG.4

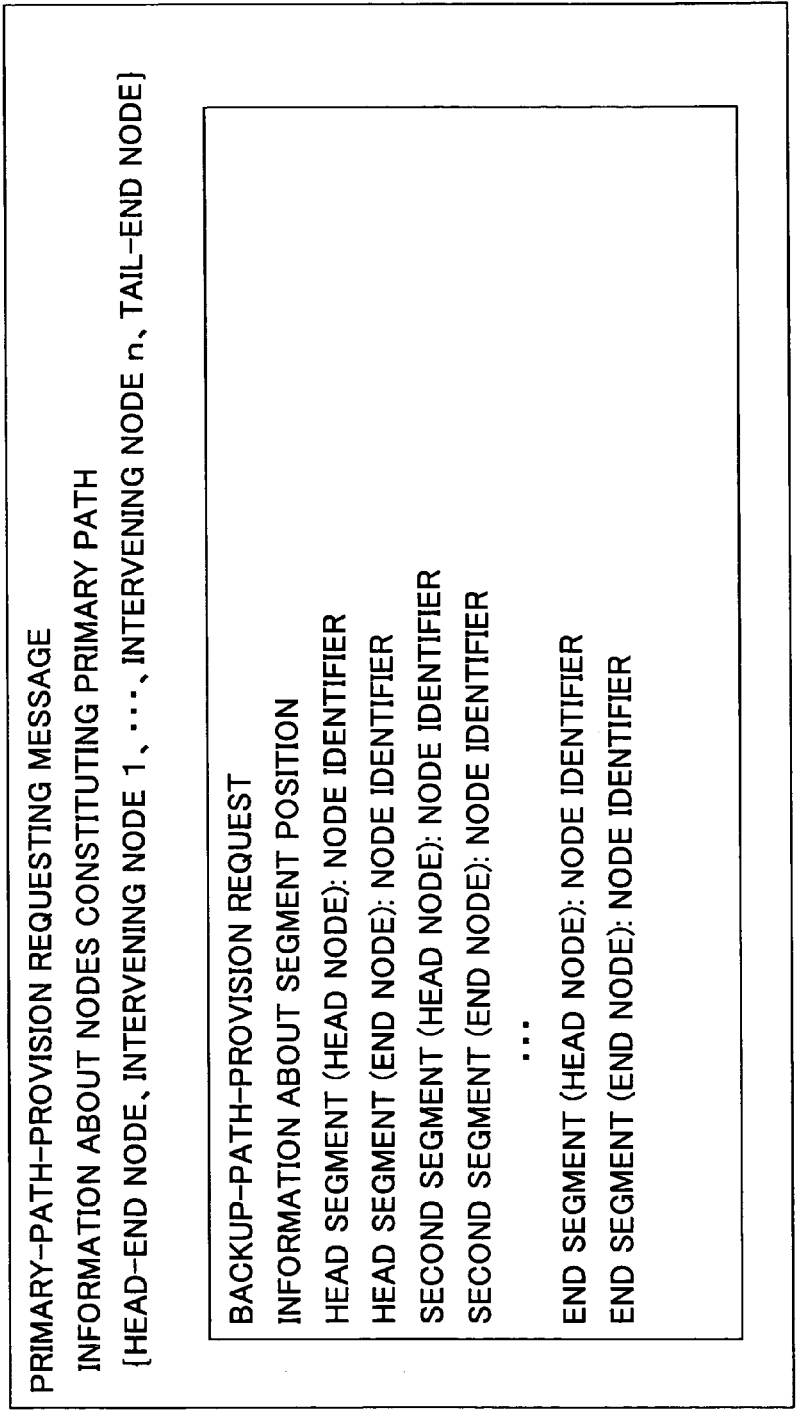

PRIMARY-PATH-PROVISION REQUESTING MESSAGE
INFORMATION ABOUT NODES CONSTITUTING PRIMARY PATH
[HEAD-END NODE, INTERVENING NODE 1, ..., INTERVENING NODE n, TAIL-END NODE]

BACKUP-PATH-PROVISION REQUEST
INFORMATION ABOUT SEGMENT POSITION
HEAD SEGMENT (HEAD NODE): NODE IDENTIFIER
HEAD SEGMENT (END NODE): NODE IDENTIFIER
SECOND SEGMENT (HEAD NODE): NODE IDENTIFIER
SECOND SEGMENT (END NODE): NODE IDENTIFIER
...
END SEGMENT (HEAD NODE): NODE IDENTIFIER
END SEGMENT (END NODE): NODE IDENTIFIER

FIG.6

PRIMARY-PATH-PROVISION REQUESTING MESSAGE
INFORMATION ABOUT NODES CONSTITUTING PRIMARY PATH
{NODE201→NODE202→NODE203→NODE204→NODE205→NODE206→NODE207}

BACKUP-PATH-PROVISION REQUEST
FIRST SEGMENT (HEAD NODE): NODE 201
FIRST SEGMENT (END NODE): 0.0.0.0
SECOND SEGMENT (HEAD NODE): NODE 204
SECOND SEGMENT (END NODE): 0.0.0.0

FIG.8

PRIMARY-PATH-PROVISION REQUESTING MESSAGE
INFORMATION ABOUT NODES CONSTITUTING PRIMARY PATH
[NODE201→NODE202→NODE203→NODE204→NODE205→NODE206→NODE207]

BACKUP-PATH-PROVISION REQUEST
FIRST SEGMENT (HEAD NODE): NODE 201
FIRST SEGMENT (END NODE): NODE 204
SECOND SEGMENT (HEAD NODE): NODE 204

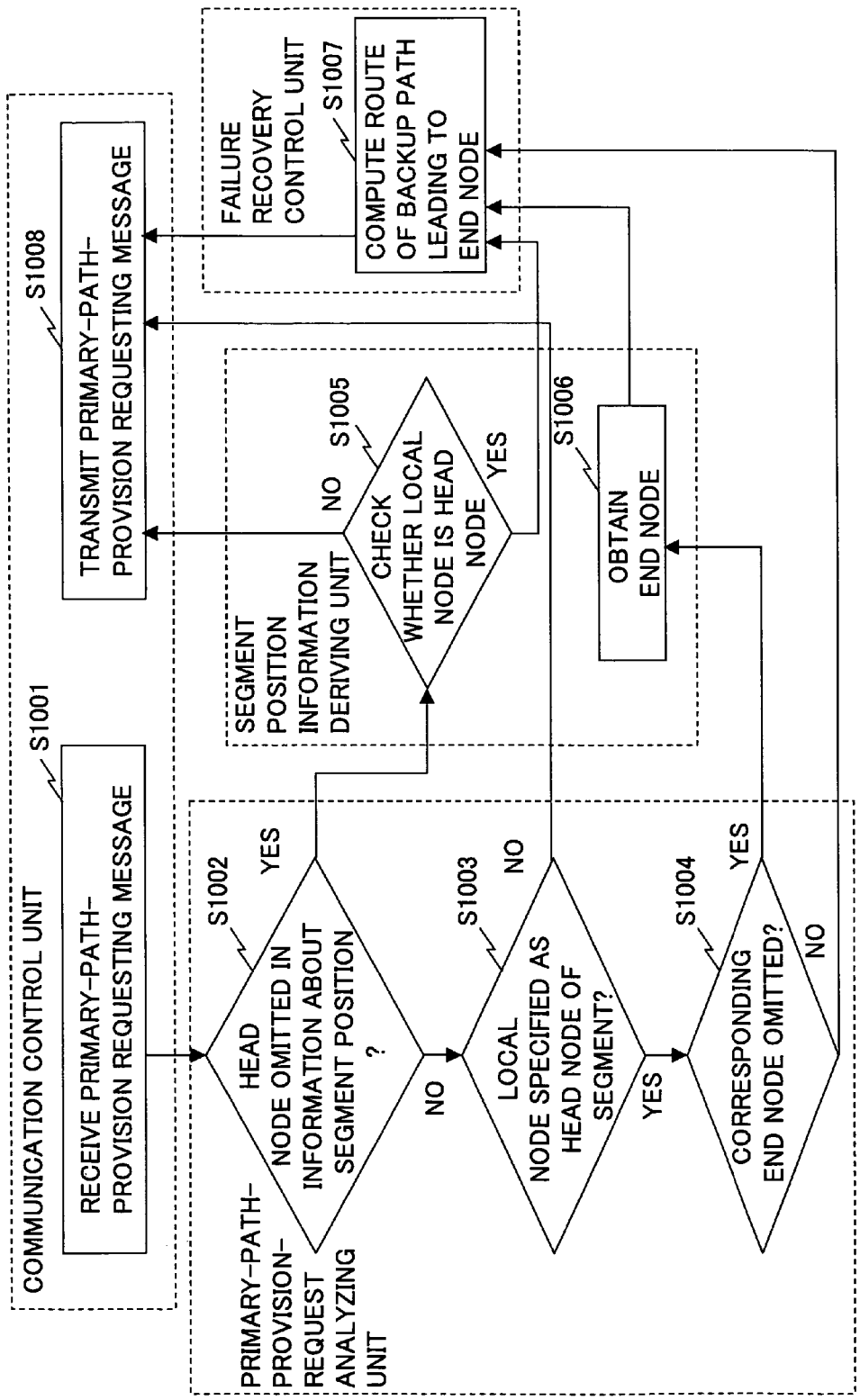

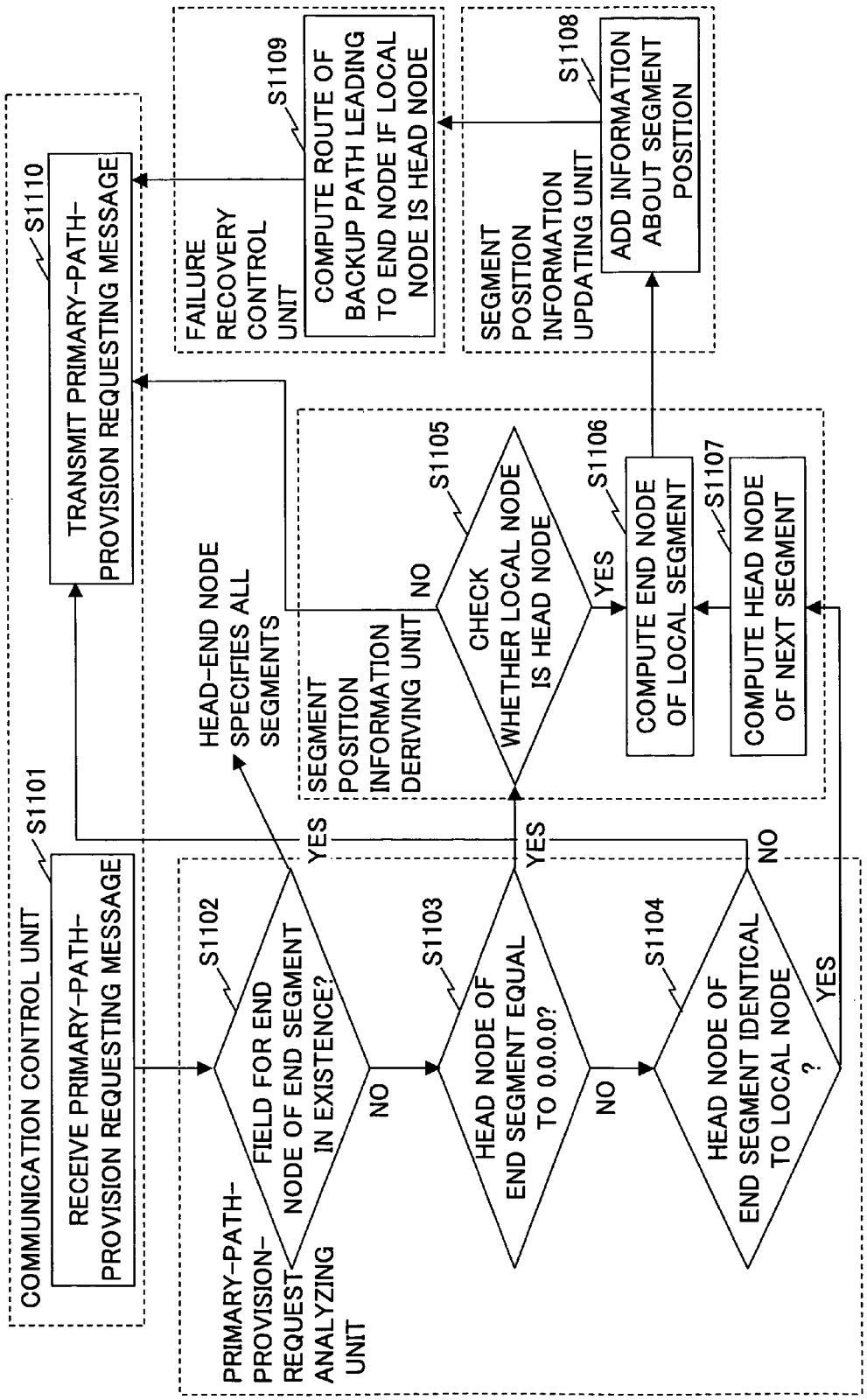

METHOD AND APPARATUS FOR SETTING UP BACKUP PATH

BACKGROUND OF THE INVENTION

1. Field of the Invention

The present invention generally relates to methods of setting up a backup path, and particularly relates to a method of setting up a backup path prior to the occurrence of a failure on a network as protection against a failure of a primary path.

2. Description of the Related Art

FastReroute is a method for failure recovery used in an MPLS (Multiprotocol Label Switching) network. In this method, a request for setting up a primary path including a request for setting up a backup path is issued from a head-end node of a primary path to a tail-end node, thereby setting up the primary path and also simultaneously setting up a backup path at each node other than the tail-end node on the primary path so as to bypass an adjacent node or link situated downstream. This makes it possible to provide protection against any node failure and link failure that may possibly occur on the primary path, and to set up backup paths prior to the occurrence of failure, thereby achieving high-speed switching of paths at the time of failure.

Patent Document 1 (Japanese Patent Application Publication No. 2000-324167) discloses selecting a bypass route between the two nodes that sandwiches a point of failure at the time of failure among a particular set of nodes selected beforehand on the path. Patent Document 2 (Japanese Patent Application Publication No. 2003-32289) discloses reducing link resources that are consumed by backup communication connections provided as the protection of main communication connections in a connection-oriented network. Patent Document 3 (Japanese Patent Application Publication No. 2001-186178) discloses a packet that is transmitted from a transmission end, and, upon failure to arrive at a receiver terminal, returns to a router based on header information and setting information after other header information is attached thereto. This packet is then transmitted to a backup path so as to arrive at the receiver terminal after the added header information is removed at the router.

In a method for failure recovery such as FastReroute, backup paths are provided at every node except for the tail-end node on a primary path. In FIG. 1, a primary path is provided, with a node 1 serving as a head-end node and a node 4 serving as a tail-end node, thereby connecting between nodes 1, 2, 3, and 4. In this case, a path connecting between nodes 1, 5, and 2, a path connecting between nodes 2, 6, and 3, and a path connecting between nodes 3, 7, and 4 are provided as backup paths for bypassing links. Further, a path connecting between nodes 1, 8, and 3 and a path connecting between nodes 2, 9, and 4 are provided as backup paths for bypassing the nodes 2 and 3, respectively.

In this manner, a large number of backup paths are provided. When such a method for failure recovery is employed, network providers must face a problem of excess consumption of network resources such as frequency bands since a large number of backup paths having no traffic during a normal operation are set up. Further, there is a problem of an increase in unwanted traffic as control messages for a large number of backup paths are transmitted through the network for the purpose of checking the validity of backup path routes even after the setting up of the backup paths.

Accordingly, there is a need for a method and apparatus for setting up backup paths that can reduce the number of backup paths to avoid excess consumption of network resources and prevent an unwanted increase in traffic.

SUMMARY OF THE INVENTION

It is a general object of the present invention to provide a method and apparatus for setting up backup paths that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a method and apparatus for setting up backup paths particularly pointed out in the specification in such full, clear, concise, and exact terms as to enable a person having ordinary skill in the art to practice the invention.

To achieve these and other advantages in accordance with the purpose of the invention, the invention provides a method of setting up a backup path for a primary path on a network. The method includes the steps of grouping nodes constituting the primary path into segments each including a plurality of nodes, and setting a backup path connecting between a head node and end node of each of the segments separately for each segment by notifying of information about segment position by a primary-path-provision requesting message.

With the method as described above, at least one embodiment of the invention can reduce the number of backup paths, thereby reducing excess consumption of network resources and avoiding an unwanted increase in traffic.

According to another aspect of the invention, an apparatus for serving as a given node in a network includes a primary-path-provision-requesting-message transmitting unit configured to respond, to a primary-path-provision request supplied from an upper-order system indicating segments into which nodes constituting a primary path are grouped, by generating a primary-path-provision requesting message including at least one of information about a position of a head node of each of the segments and information about a position of an end node of each of the segments for transmission to nodes situated downstream on the primary path, and a backup-path setting unit configured to set up a backup path connecting between the given node and an end node of a segment starting from the given node.

According to another aspect of the invention, an apparatus for serving as a given node in a network includes a backup-path setting unit configured to respond, to a primary-path-provision requesting message supplied from a node situated upstream including at least one of information about a position of a head node of each segment and information about a position of an end node of each segment, by setting up a backup path connecting between the given node and an end node of a segment starting from the given node if the given node is a head node of a segment.

With the apparatus as described above, at least one embodiment of the invention can supply the primary-path-provision requesting message to all the nodes on the primary path, and can set up a backup path at the head node of a segment.

BRIEF DESCRIPTION OF THE DRAWINGS

Other objects and further features of the present invention will be apparent from the following detailed description when read in conjunction with the accompanying drawings, in which:

FIG. 4 is an illustrative drawing showing the format of a primary-path-provision requesting message according to the invention;

FIG. 6 is an illustrative drawing showing a second embodiment of a primary-path-provision requesting message;

FIG. 8 is an illustrative drawing showing a fourth embodiment of a primary-path-provision requesting message;

FIG. 11 is a flowchart of the process performed by nodes other than the head-end node in the first through third embodiments; and FIG. 12 is a flowchart of the process performed by each node in the fourth and fifth embodiments.

DESCRIPTION OF THE PREFERRED EMBODIMENTS

In the following, embodiments of the present invention will be described with reference to the accompanying drawings.

Figure 1:
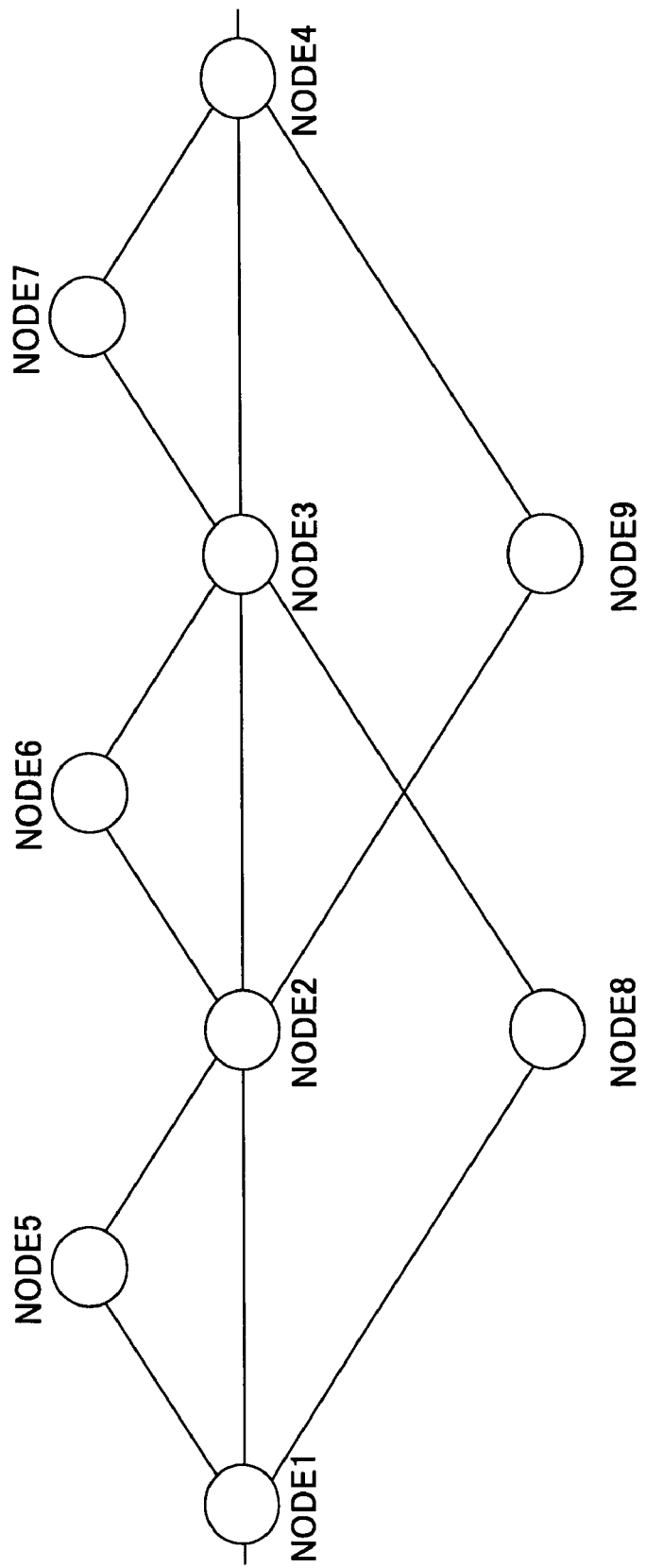
FIG. 1 is an illustrative drawing for explaining the provision of a primary path and backup paths in a related-art method.
Figure 2:
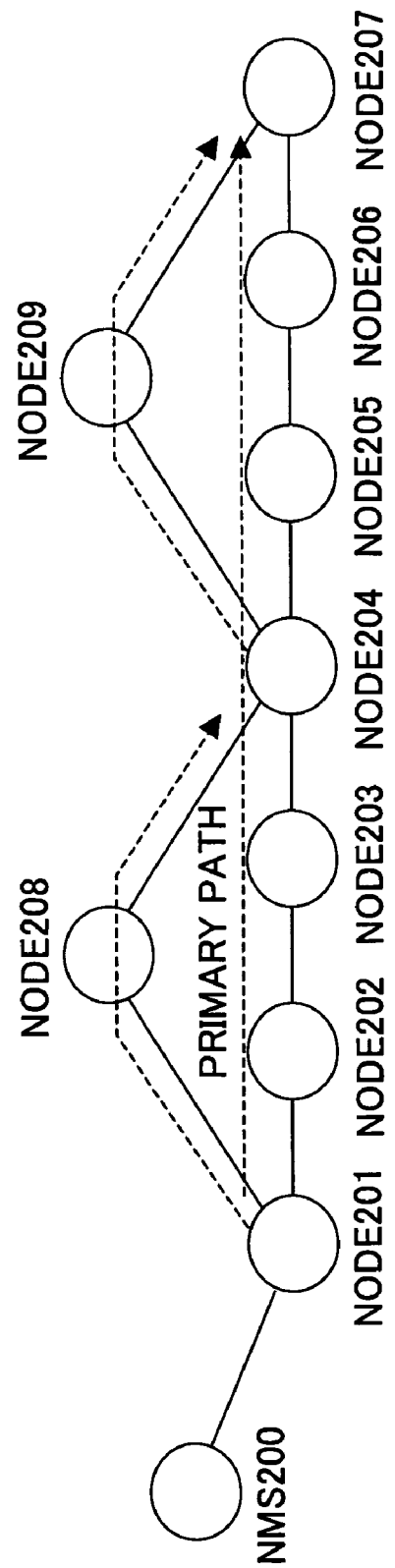
FIG. 2 is an illustrative drawing for explaining the provision of a primary path and backup paths according to the invention.

In the present invention, segments are provided, each of which is comprised of a plurality of contiguous nodes on a primary path as shown in FIG. 2. In FIG. 2, a primary path connecting between nodes 201, 202, 203, 204, 205, 206, and 207 is set up, with the node 201 serving as a head-end node and the node 207 serving as a tail-end node, in response to a request for the setting up of a primary path from an NMS (Network Management System) 200. The nodes 201, 202, 203, and 204 constitute a first segment, and the nodes 204, 205, 206, and 207 make up a second segment.

As a backup path for bypassing the first segment, a path connecting between 201, 208, and 204 is set up. As a backup path for bypassing the second segment, a path connecting between 204, 209, and 207 is set up.

Figure 3:
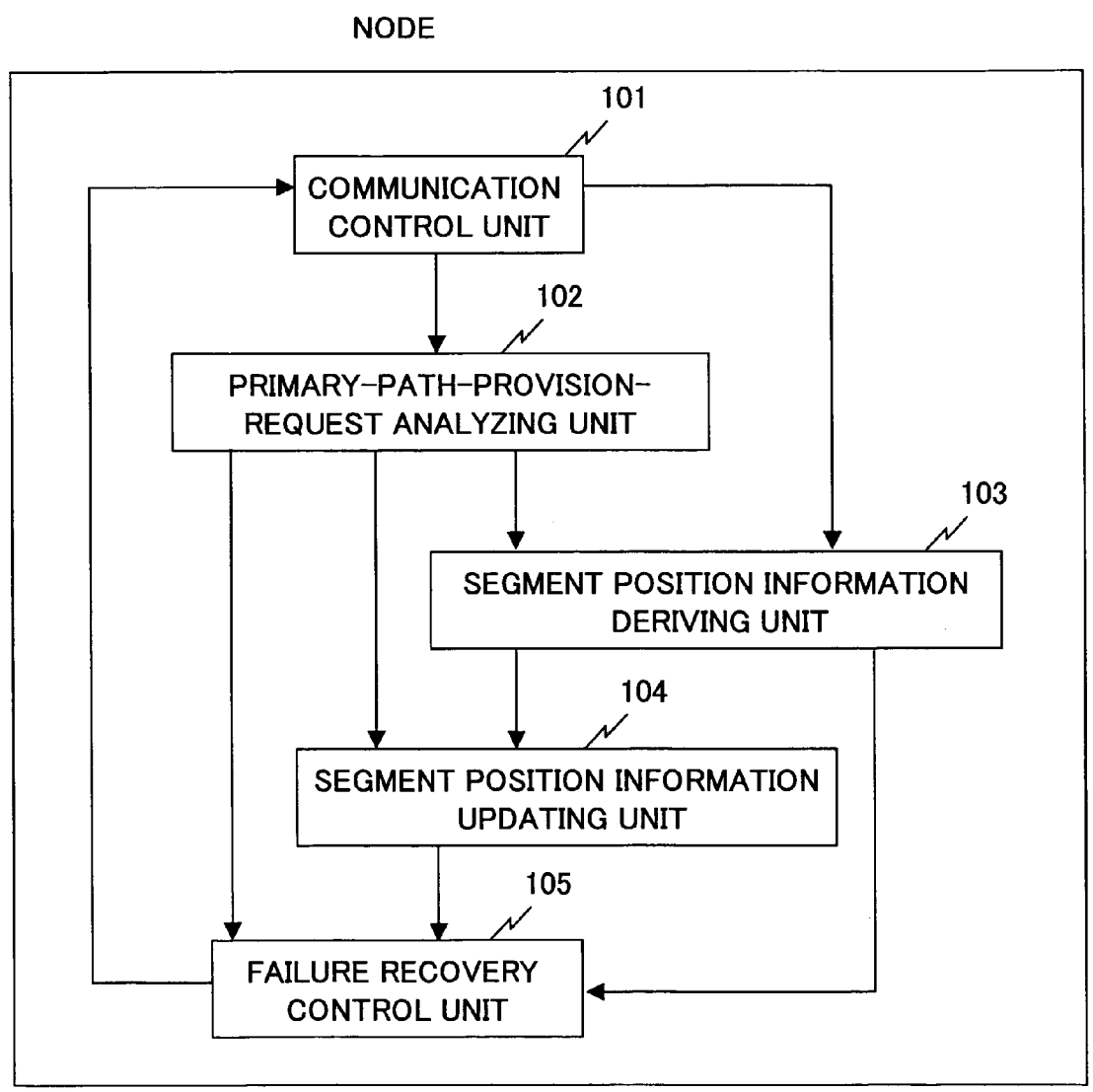
FIG. 3 is a block diagram showing an embodiment of a node apparatus used in a network that practices the method of setting up a backup path according to the invention.

FIG. 3 is a block diagram showing an embodiment of a node apparatus used in a network that practices the method of setting up a backup path according to the invention. In FIG. 3, a communication control unit 101 exchanges control messages with adjacent nodes connected through links and with the NMS, and also exchanges a primary-path provision request by use of a command interface or the like.

A primary-path-provision-request analyzing unit 102 analyzes information about segment position that is included in a primary-path-provision request received from the NMS and also included in a primary-path-provision requesting message received from a node situated upstream on the primary path. Based on the analysis, a check is made as to whether the local node is the head node of the segment or the end node of the segment. Further, when the information about segment position is omitted, information about segment position and information about nodes constituting the primary path are extracted from the primary-path-provision requesting message for transmission to a segment position information deriving unit 103 for use in the interpolation of the information about segment position.

If the local node is the head node of the segment, the segment position information deriving unit 103 identifies the end node of the segment among the nodes constituting the primary node if information about the end node is missing. If there is no indication of the head node of the segment, a check is made as to whether the local node is the head node of the segment.

A segment position information updating unit 104 sets the information about segment position in the primary-path-provision requesting message by inserting information about segment position necessary for setting up a backup path at nodes situated downstream.

A failure recovery control unit 105 computes a route through which the backup path takes to reach the end node of the segment if the local node is the head node of the segment.

FIG. 4 is an illustrative drawing showing the format of a primary-path-provision requesting message according to the invention. The primary-path-provision requesting message is generated at a head-end node that has received a primary-path-provision request from the NMS, and is transmitted to nodes situated downstream on the primary path.

The primary-path-provision requesting message includes information about nodes constituting the primary path, which is a description of nodes arranged in the order in which these nodes appear along the primary path starting from the head-end node and ending at the tail-end node. Further, information about segment position is also included. In the information about segment position, the position of the head node of each segment (i.e., node identifier) and the position of the end node of each segment (i.e., node identifier) are described in the order in which the segments appear (i.e., in the order in which the head node of segments appear along the primary path extending from upstream to downstream). The position of the head node and the position of the end node may be omitted by assigning 0.0.0.0, for example.

In the following, a first embodiment of the invention will be described.

Figure 5:
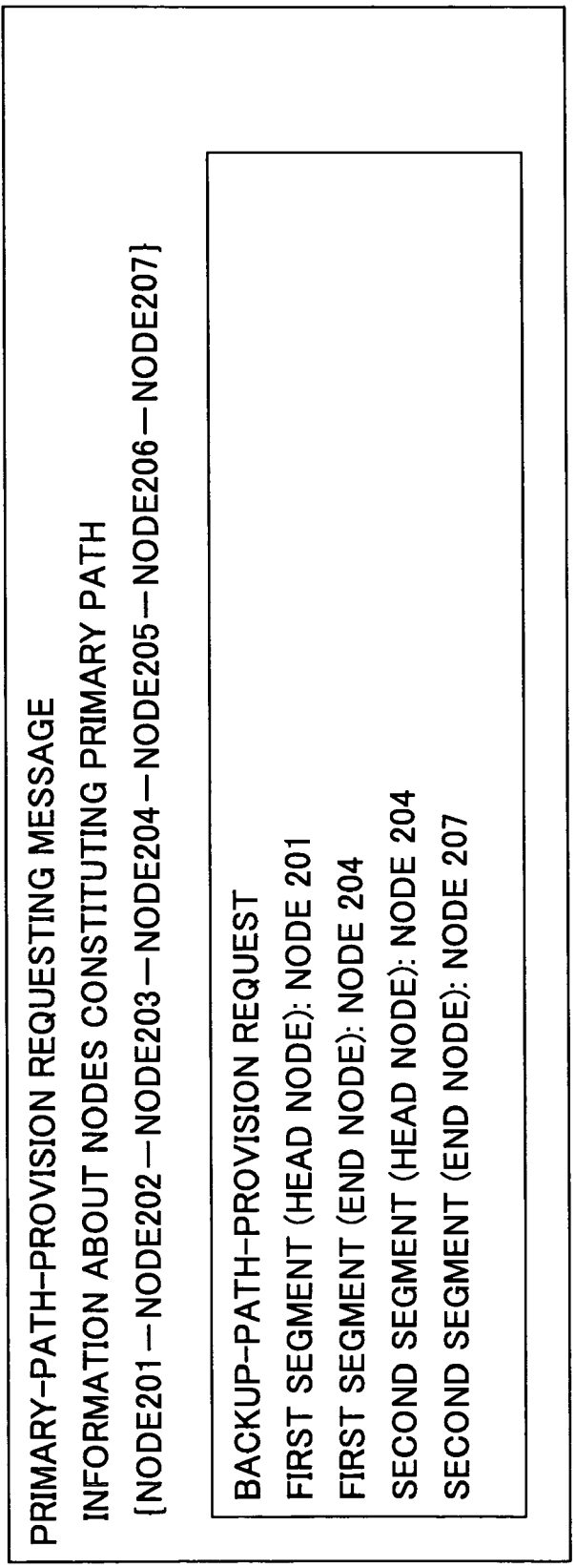
FIG. 5 is an illustrative drawing showing a first embodiment of a primary-path-provision requesting message.

The segment position information updating unit 104 of the head-end node 201 of a primary path receives a primary-path-provision request from the NMS 200 including information about nodes constituting the primary path and information about segment position indicative of the head node and end node of each segment provided in the primary path, and sets the information about segment position indicative of the head node and end node of each segment in the primary-path-provision requesting message as shown in FIG. 5 for transmission to the tail-end node 207 from the communication control unit 101. If the local node is the head node of a segment, the failure recovery control unit 105 derives a backup path reaching the end node obtained from the primary-path-provision-request analyzing unit 102, and transmits control messages for setting up the primary path and backup path by use of the communication control unit 101.

FIG. 5 is an illustrative drawing showing a first embodiment of a primary-path-provision requesting message. In this embodiment, information about nodes constituting a primary path includes nodes 201, 202, 203, 204, 205, 206, and 207. In information about segment position, further, the node 201 is set as the head node of the first (head) segment, with the node 204 set as the end node. Further, the node 204 is set as the head node of the second (end) segment, with the node 207 set as the end node.

In the example shown in FIG. 5, the end node 204 of the first segment is the same as the head node 204 of the second segment, thereby forming a structure for link-failure recovery. In the case of a structure for node-failure recovery, the head node 203 of the second segment is provided upstream relative to the end node 204 of the first segment.

At each node other than the head-end node 201 where the communication control unit 101 receives the primary-path-provision requesting message of FIG. 5, the primary-path-provision-request analyzing unit 102 analyzes whether the local node is specified as a head node in the information about segment position. If the local node is a head node, information about the position of the end node is obtained from the primary-path-provision requesting message.

When the local node is the head node of a segment, the failure recovery control unit 105 derives a route of a backup path extending to the end node that is obtained from the primary-path-provision-request analyzing unit 102, and transmits control messages for setting up the primary path and backup path by use of the communication control unit 101.

In the following, a description will be given of a second embodiment of the invention.

The segment position information updating unit 104 of the head-end node 201 of a primary path receives a primary-path-provision request from the NMS 200 including information about nodes constituting the primary path and information about segment position indicative of only the head node of each segment provided in the primary path, and sets the information about segment position indicative of the head node of each segment in the primary-path-provision requesting message as shown in FIG. 6 for transmission to the tail-end node 207 from the communication control unit 101. If the local node is the head node of a segment, the segment position information deriving unit 103 identifies the end node of this segment. The failure recovery control unit 105 derives a backup path reaching the end node obtained from the segment position information deriving unit 103, and transmits control messages for setting up the primary path and backup path by use of the communication control unit 101.

FIG. 6 is an illustrative drawing showing a second embodiment of a primary-path-provision requesting message. In this embodiment, information about nodes constituting a primary path includes nodes 201, 202, 203, 204, 205, 206, and 207. In information about segment position, further, the node 201 is set as the head node of the first (head) segment, with the end node being omitted as indicated by 0.0.0.0 assigned thereto. Further, the node 204 is set as the head node of the second (end) segment, with the end node being omitted as indicated by 0.0.0.0 assigned thereto.

At each node other than the head-end node 201 where the communication control unit 101 receives the primary-path-provision requesting message of FIG. 6, the primary-path-provision-request analyzing unit 102 analyzes whether the local node is specified as a head node in the information about segment position. If the local node is the head node of a segment, the information about the nodes constituting the primary path and information about the head node of the next segment specified in the information about segment position are obtained from the primary-path-provision requesting message.

When the local node is the head node of a given segment, the segment position information deriving unit 103 identifies the end node of this segment based on the positional relationship between the nodes constituting the primary path and the head node of the next segment obtained from the primary-path-provision-request analyzing unit 102. The failure recovery control unit 105 then derives a route of a backup path extending to the end node, and transmits control messages for setting up the primary path and backup path by use of the communication control unit 101.

The end node as identified above is the same as the head node of the next segment in the case of the link-failure-recovery structure, and is a node situated further downstream than the head node of the next segment in the case of the node-failure-recovery structure.

In the following, a description will be given of a third embodiment of the invention.

Figure 7:
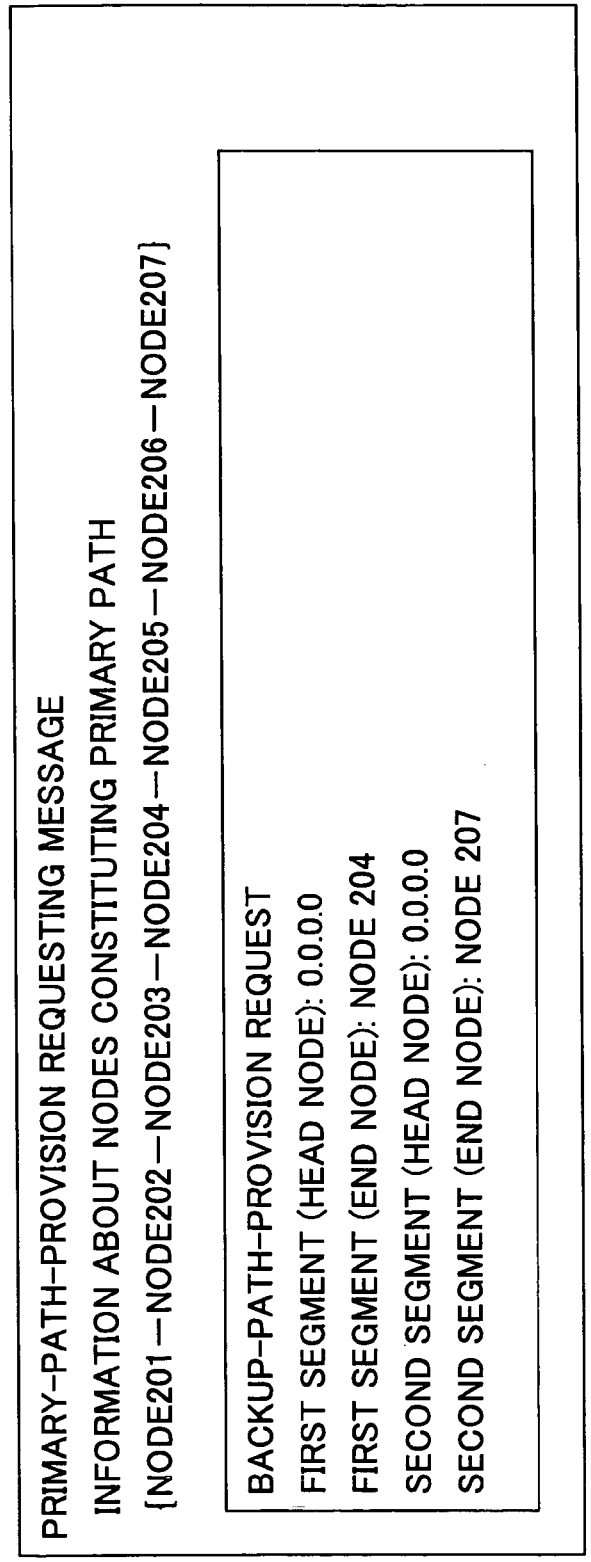
FIG. 7 is an illustrative drawing showing a third embodiment of a primary-path-provision requesting message.

The segment position information updating unit 104 of the head-end node 201 of a primary path receives a primary-path-provision request from the NMS 200 including information about nodes constituting the primary path and information about segment position indicative of only the end node of each segment provided in the primary path, and sets the information about segment position indicative of the end node of each segment in the primary-path-provision requesting message as shown in FIG. 7 for transmission to the tail-end node 207 from the communication control unit 101. If the local node is the head node of a segment, the failure recovery control unit 105 derives a route of a backup path extending to the end node that is obtained from the primary-path-provision-request analyzing unit 102, and transmits control messages for setting up the primary path and backup path by use of the communication control unit 101.

FIG. 7 is an illustrative drawing showing a third embodiment of a primary-path-provision requesting message. In this embodiment, information about nodes constituting a primary path includes nodes 201, 202, 203, 204, 205, 206, and 207. In information about segment position, further, the head node of the first (head) segment is omitted as indicated by "0.0.0.0" assigned thereto, with the node 204 being set as the end node. Further, the head node of the second (end) segment is omitted as indicated by "0.0.0.0" assigned thereto, with the node 207 being set as the end node.

At each node other than the head-end node 201 where the communication control unit 101 receives the primary-path-provision requesting message of FIG. 7, the primary-path-provision-request analyzing unit 102 finds that head nodes are omitted in the information about segment position contained in the primary-path-provision requesting message, and obtains the information about the nodes constituting the primary path and positional information about the end node of each segment specified in the information about segment position.

The segment position information deriving unit 103 determines whether the local node is the head node of a segment based on the positional relationship between the nodes constituting the primary path and the end node of each segment obtained from the primary-path-provision-request analyzing unit 102. If the local node is the head node of a segment, the failure recovery control unit 105 derives a route of a backup path extending to the specified end node, and transmits control messages for setting up the primary path and backup path by use of the communication control unit 101.

The head node as identified above is the same as the end node of a preceding segment in the case of the link-failure-recovery structure, and is a node situated further upstream than the end node of a preceding segment in the case of the node-failure-recovery structure.

In the following, a description will be given of a fourth embodiment of the invention.

The communication control unit 101 of the head-end node 201 of a primary path receives from the NMS 200 a primary-path-provision request indicative of information about nodes constituting the primary path (not including information about segment position indicative of the head node and end node of each segment). The primary-path-provision request may include conditions specified for the purpose of allowing the head node of a segment to determine the end node of the segment, such conditions including the maximum number of nodes tolerable for constituting each segment, the minimum number of nodes that are necessary, and the number of segments dividing up the primary path. If the local node is the head node of a segment, the segment position information deriving unit 103 identifies the end node of the head segment and the head node of the next segment.

The segment position information updating unit 104 of the head-end node 201 of the primary path sets information about segment position in the primary-path-provision requesting message based on the information about nodes constituting the primary path and the number of segment nodes (if specified) contained in the primary-path-provision request received from the NMS 200. This information indicates the head node and end node of the head segment and the head node of the end segment, and lacks a field for indicating the end node of the end segment, as shown in FIG. 8. The primary-path-provision requesting message is transmitted to the tail-end node 207 from the communication control unit 101. If the local node is the head node of a segment, the failure recovery control unit 105 obtains a route of a backup path leading to the end node that is obtained from the segment position information deriving unit 103, and transmits control messages for setting up the primary path and backup path by the use of the communication control unit 101.

FIG. 8 is an illustrative drawing showing a fourth embodiment of a primary-path-provision requesting message. In this embodiment, information about nodes constituting a primary path includes nodes 201, 202, 203, 204, 205, 206, and 207. In information about segment position, further, the node 201 is set as the head node of the first (head) segment, with the node 204 set as the end node. Further, the node 204 is set as the head node of the second (end) segment.

At each node other than the head-end node 201 where the communication control unit 101 receives the primary-path-provision requesting message of FIG. 8, the primary-path-provision-request analyzing unit 102 analyzes whether the local node is specified as the head node of a next segment (the head node of the preceding segment identified by the head node of the preceding segment) in the primary-path-provision requesting message. If the local node is specified as the head node, the information about nodes constituting the primary path is obtained from the primary-path-provision requesting message.

If the local node is the head node of the end segment, the segment position information deriving unit 103 selects on its own the end node of the segment and the head node of the end segment from downstream nodes constituting the primary path based on the number of segment nodes obtained from the primary-path-provision-request analyzing unit 102. The segment position information updating unit 104 then sets the information about segment position indicative of the end node of the current segment and the head node of the next segment in the primary-path-provision requesting message. The failure recovery control unit 105 derives a route of a backup path extending to the end node, and transmits control messages for setting up the primary path and backup path by use of the communication control unit 101.

The head node as identified above is the same as the end node of the preceding segment in the case of the link-failure-recovery structure, and is a node situated further upstream than the end node of the preceding segment in the case of the node-failure-recovery structure. The end node as identified above is the same as the head node of the next segment in the case of the link-failure-recovery structure, and is a node situated further downstream than the head node of the next segment in the case of the node-failure-recovery structure.

In the following, a description will be given of a fifth embodiment of the invention.

The communication control unit 101 of the head-end node 201 of a primary path receives from the NMS 200 a primary-path-provision request indicative of information about nodes constituting the primary path (not including information about segment position indicative of the head node and end node of each segment). The primary-path-provision request may include conditions specified for the purpose of allowing the head node of a segment to determine the end node of the segment, such conditions including the maximum number of nodes tolerable for constituting each segment, the minimum number of nodes that are necessary for each segment, and the number of segments dividing up the primary path.

Figure 9:
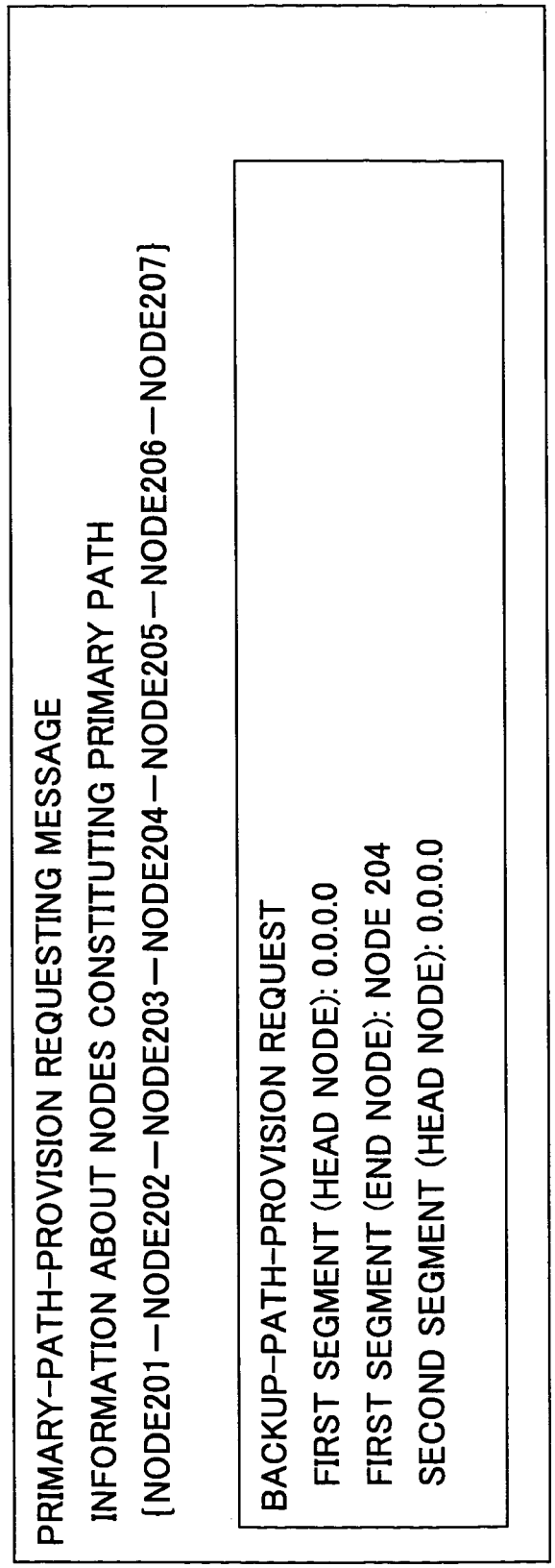
FIG. 9 is an illustrative drawing showing a fifth embodiment of a primary-path-provision requesting message.

The segment position information updating unit 104 of the head-end node 201 of the primary path sets information about segment position in the primary-path-provision requesting message based on the information about nodes constituting the primary path and the number of segment nodes (if specified) contained in the primary-path-provision request received from the NMS 200. This information indicates only the end node of the head segment as shown in FIG. 9. The primary-path-provision requesting message is transmitted to the tail-end node 207 from the communication control unit 101. If the local node is the head node of a segment, the failure recovery control unit 105 obtains a route of a backup path leading to the end node that is obtained from the primary-path-provision-request analyzing unit 102, and transmits control messages for setting up the primary path and backup path by the use of the communication control unit 101.

FIG. 9 is an illustrative drawing showing a fifth embodiment of a primary-path-provision requesting message. In this embodiment, information about nodes constituting a primary path includes nodes 201, 202, 203, 204, 205, 206, and 207. In information about segment position, further, the head node of the first (head) segment is omitted as indicated by 0.0.0.0 assigned thereto, with the node 204 set as the end node. Further, the head node of the second (end) segment is omitted as indicated by 0.0.0.0 assigned thereto.

At each node other than the head-end node 201 where the communication control unit 101 receives the primary-path-provision requesting message, the primary-path-provision-request analyzing unit 102 finds that the head node of the end segment is not specified and a field for the end node thereof is not in existence in the information about segment position. The primary-path-provision-request analyzing unit 102 then obtains the position of the end node of a segment preceding the end node, the information about the nodes constituting the primary paths, and the number of segment nodes (if specified) from the primary-path-provision requesting message.

The segment position information deriving unit 103 determines whether the local node is the head node of a segment, based on the position of the end node of a segment preceding the end segment and the information about nodes constituting the primary path contained in the information about segment position obtained from the primary-path-provision-request analyzing unit 102. If the local node is the head node of a segment, the segment position information deriving unit 103 selects on its own the end node of the segment from downstream nodes constituting the primary path. The segment position information updating unit 104 then sets the information about segment position indicative of the end node of the current segment in the primary-path-provision requesting message. The failure recovery control unit 105 derives a route of a backup path extending to the end node, and transmits control messages for setting up the primary path and backup path by use of the communication control unit 101.

The head node as identified above is the same as the end node of the preceding segment in the case of the link-failure-recovery structure, and is a node situated further upstream than the end node of the preceding segment in the case of the node-failure-recovery structure. The end node as identified above is the same as the head node of the next segment in the case of the link-failure-recovery structure, and is a node situated further downstream than the head node of the next segment in the case of the node-failure-recovery structure.

A detailed description will be given of the first embodiment with reference to FIG. 10 and FIG. 11.

Figure 10:
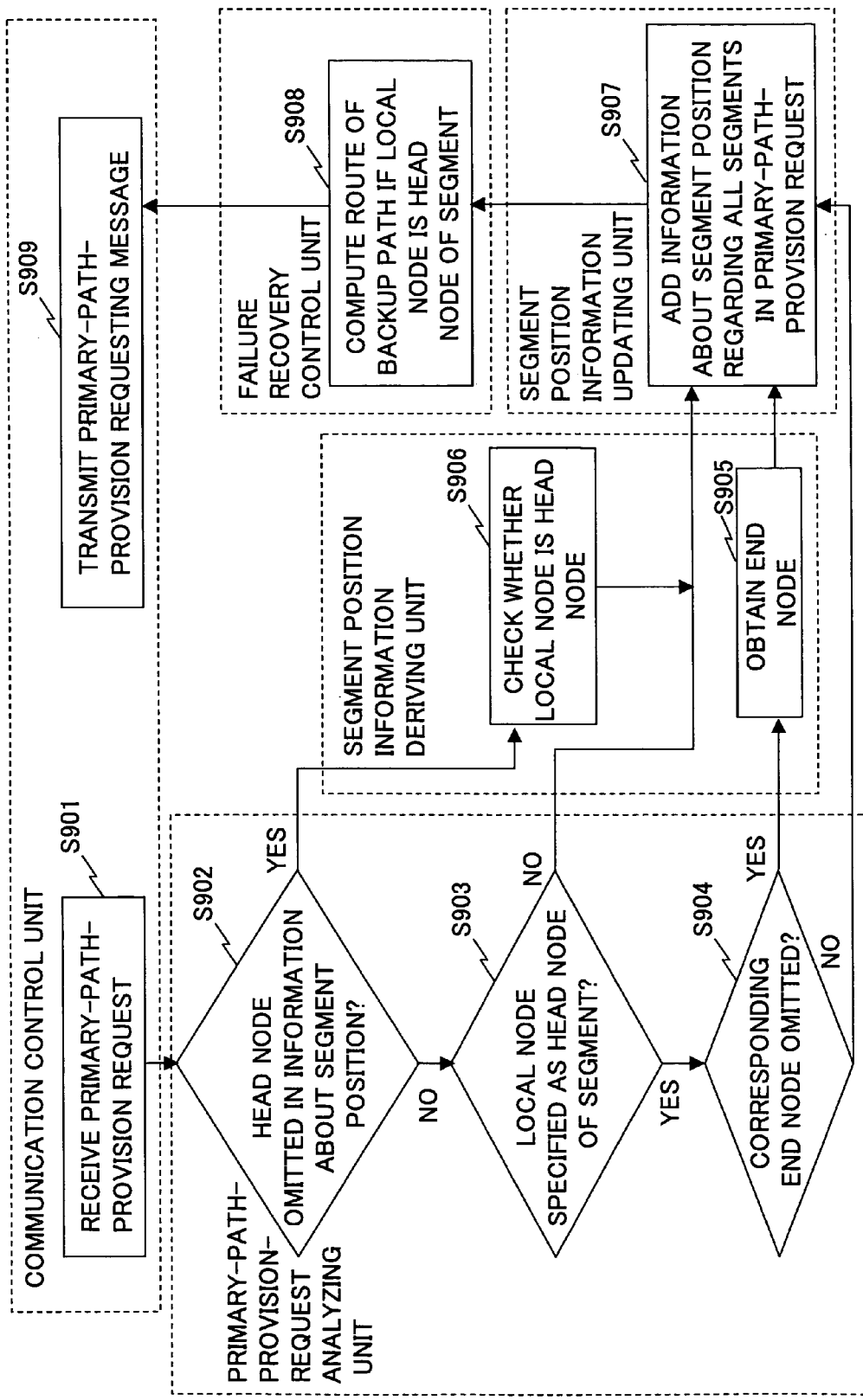
FIG. 10 is a flowchart of the process performed by a head-end node in the first through third embodiments.

FIG. 10 is a flowchart of the process performed by the head-end node in the first through third embodiments. FIG. 11 is a flowchart of the process performed by nodes other than the head-end node in the first through third embodiments.

In FIG. 10, the head-end node 201 uses the communication control unit 101 to receive a primary-path-provision request from the NMS 200 (step 901). The primary-path-provision request includes information about segment position regarding segments to be provided on the primary path, indicating the node 201 as the head node of the first segment, the node 204 as the end node thereof, the node 204 as the head node of the second segment, and the node 207 as the end node thereof.

Upon receipt of the primary-path-provision request from the communication control unit 101, the primary-path-provision-request analyzing unit 102 compares the head node of each segment contained in the information about segment position with the local node to find that the local node is the head node of a segment (step 903) and also to find that the corresponding end node is also specified (step 904). Since the node 201 is a head-end node, the segment position information updating unit 104 sets the information about segment position indicative of segments to be set up in the primary-path-provision requesting message (step 907).

The failure recovery control unit 105 computes a route of a backup path leading to the end node 204 of the segment of interest, and generates control messages for the backup path (step 908). Further, the communication control unit 101 transmits the control messages for the backup path to the node 208, and transmits the primary-path-provision requesting message inclusive of a backup-path-provision request to the node 202 (step 909).

In FIG. 11, the communication control unit 101 at segment intervening nodes such as the nodes 202 and 203 receives the primary-path-provision requesting message transmitted from a node situated upstream (step 1001). Upon receipt of the primary-path-provision requesting message from the communication control unit 101, the primary-path-provision-request analyzing unit 102 compares the head node of each segment contained in the information about segment position with the local node to find that the local node is not the head node of a segment (step 1003). The communication control unit 101 then transmits the primary-path-provision requesting message to a node situated downstream (step 1008).

At the node 204, the communication control unit 101 receives the primary-path-provision requesting message (step 1001). Upon receipt of the primary-path-provision requesting message from the communication control unit 101, the primary-path-provision-request analyzing unit 102 compares the head node of each segment contained in the information about segment position with the local node to find that the local node is the head node of a segment (step 1003).

It is also found that the end node of the segment is specified in the information about segment position (step 1004). The failure recovery control unit 105 computes a route of a backup path leading to the end node 207 of the segment of interest, and generates control messages for the backup path (step 1007). Further, the communication control unit 101 transmits the control messages for the backup path to the node 209, and transmits the primary-path-provision requesting message inclusive of a backup-path-provision request to the node 205 (step 1008).

A detailed description will be given of the second embodiment with reference to FIG. 10 and FIG. 11.

In FIG. 10, the head-end node 201 uses the communication control unit 101 to receive from the NMS 200 a primary-path-provision request indicating the node 201 as the head node of the first segment and the node 204 as the head node of the second segment (step 901). Upon receipt of the primary-path-provision request from the communication control unit 101, the primary-path-provision-request analyzing unit 102 compares the head node of each segment contained in the information about segment position with the local node to find that the local node is the head node of a segment (step 903).

It is also found that the end node of the segment is omitted (step 904). In response, the segment position information deriving unit 103 that obtains information about nodes constituting the primary path and the head node of a next segment from the primary-path-provision request selects the end node of the segment of interest from downstream nodes on the primary path by taking into account the fact that the head node of the next segment is the node 204 (step 905). In this example, the node 204 is selected as the end node. Since the node 201 is a head-end node, the segment position information updating unit 104 sets the information about segment position indicative of segments to be set up in the primary-path-provision requesting message (step 907). A route of a backup path is then computed (step 908). Further, control messages for the backup path and the primary-path-provision requesting message inclusive of a backup-path-provision request are transmitted (step 909).

In FIG. 11, the communication control unit 101 at segment intervening nodes such as the nodes 202 and 203 receives the primary-path-provision requesting message transmitted from a node situated upstream (step 1001). Upon receipt of the primary-path-provision requesting message from the communication control unit 101, the primary-path-provision-request analyzing unit 102 compares the head node of each segment contained in the information about segment position with the local node to find that the local node is not the head node of a segment (step 1003). The communication control unit 101 then transmits the primary-path-provision requesting message to a node situated downstream (step 1008).

Like the node 202, the node 204 compares the head node of each segment contained in the information about segment position with the local node to find that the local node is the head node of a segment (step 1003). It is also found that the end node of the segment is omitted (step 1004). The segment position information deriving unit 103 selects the tail-end node of the primary path as the end node of the segment of interest because the head node of the next segment does not exists (step 1006). Being informed of the end node 207 of the segment of interest from the segment position information deriving unit 103, the failure recovery control unit 105 computes a route of a backup path (step 1007), and generates control messages for the backup path. Further, the communication control unit 101 transmits the control messages for the backup path to the node 209, and transmits the primary-pathprovision requesting message inclusive of a backup-path-provision request to the node 205 (step 1008).

A detailed description will be given of the third embodiment with reference to FIG. 10 and FIG. 11.

In FIG. 10, the head-end node 201 uses the communication control unit 101 to receive a primary-path-provision request indicating the node 204, as the end node of the first segment and the node 207 as the end node of the second segment (step 901). Upon receipt of the primary-path-provision request from the communication control unit 101, the primary-path-provision-request analyzing unit 102 learns that the head node of a segment is omitted (step 902), and obtains the information about nodes constituting the primary path and the end node of each segment from the primary-path-provision request.

Since the local node is the head-end node in this case, the segment position information deriving unit 103 determines that the local node is the head node of the head segment (step 906). Since the node 201 is the head-end node, the segment position information updating unit 104 sets the information about segment position indicative of segments to be set up on the primary path in the primary-path-provision requesting message (step 907). A route of a backup path is then computed (step 908). Further, control messages for the backup path and the primary-path-provision requesting message inclusive of a backup-path-provision request are transmitted (step 909).

In FIG. 11, at downstream nodes other than the head-end node of the primary path, the segment position information deriving unit 103 compares the end node of each segment with the local node to determine whether the local node is the head node of a segment (step 1005). In the link-failure-recovery structure, for example, the end node of a segment is the same as the head node of the next segment. If this rule is applied, the node 204 is the head node of the second segment. Then, a route of a backup path leading to the specified node 207 is obtained (step 1007). It should be noted that the end node 207 of the second segment is the tail-end node of the primary path, so that no provision of a backup path is performed.

In the following, a detailed description will be given of the fourth embodiment with reference to FIG. 12.

FIG. 12 is a flowchart of the process performed by each node in the fourth and fifth embodiments.

In FIG. 12, the communication control unit 101 of the head-end node 201 receives a primary-path-provision request (step 1101). The primary-path-provision request includes information about nodes constituting a primary path and the number of segment nodes, and also includes an instruction requiring that the head node of a specified segment select on its own the end node of the segment from downstream nodes on the primary path.

Upon receipt of the primary-path-provision request from the communication control unit 101, the primary-path-provision-request analyzing unit 102 compares the head node contained in the information about nodes constituting the primary path with the local node to find that the local node is the head node of a segment (step 1104).

If the primary-path-provision-request analyzing unit 102 finds that the end node of the end segment is specified (step 1102), the head-end node 201 performs the process of FIG. 10 to identify the head node or end node of all the segments.

The segment position information deriving unit 103 selects on its own the end node of the segment of interest and the head node of the next segment from nodes situated downstream on the primary path. In this example, the node 204, for example, is selected as the head node of the next segment by taking into account restrictions such as an indication of the number of segment nodes (step 1107). Further, the rule that the end node of a segment is the same as the head node of the next segment in the case of the link-failure-recovery structure is applied, so that the node 204 is determined to be the end node of the current segment (step 1106).

After this, the segment position information updating unit 104 sets the end node of the current segment and the head node of the next segment in the primary-path-provision requesting message (step 1108). A route of a backup path is then computed (step 1109). Further, control messages for the backup path and the primary-path-provision requesting message inclusive of a backup-path-provision request are transmitted (step 1110).

The communication control unit 101 at segment intervening nodes such as the nodes 202 and 203 receives the primary-path-provision requesting message transmitted from a node situated upstream (step 1101). Upon receipt of the primary-path-provision requesting message from the communication control unit 101, the primary-path-provision-request analyzing unit 102 compares the head node of the end segment contained in the information about segment position with the local node to find that the local node is not the head node of a segment (step 1104). The communication control unit 101 then transmits the primary-path-provision requesting message to a node situated downstream (step 1110).

At the node 204, the communication control unit 101 receives the primary-path-provision requesting message (step 1101). Upon receipt of the primary-path-provision requesting message from the communication control unit 101, the primary-path-provision-request analyzing unit 102 compares the head node of the end segment contained in the information about segment position with the local node to find that the local node is the head node of a segment (step 1104). Since there is no field for the end node of a segment, information about nodes constituting the primary path is obtained from the primary-path-provision requesting message in order to determine the end node.

Based on the fact that a field for the end node of the end segment does not exist, it can be ascertained that the head-end node does not specify information about segment position indicative of segments to be set up on the primary path. Alternatively, a flag may be provided in the message to indicate whether the head-end node specifies information about segment position indicative of segments to be set up on the primary path, so that downstream nodes check the flag.

The segment position information deriving unit 103 selects on its own the node 207 as the head node of the next segment from nodes situated downstream on the primary path (step 1107). Further, the segment position information deriving unit 103 selects the node 207 as the end node of the current segment (step 1106). The segment position information updating unit 104 then sets the end node of the current segment and the head node of the next segment in the primary-path-provision requesting message (step 1108). It should be noted that the end node of the current segment may be omitted.

The node 207 is selected as the head node of a segment, but is the tail-end node of the primary path, so that no provision of a backup path is performed.

In the following, a detailed description will be given of the fifth embodiment with reference to FIG. 12.

In FIG. 12, the communication control unit 101 of the head-end node 201 receives a primary-path-provision request (step 1101). The primary-path-provision request includes information about nodes constituting a primary path and the number of segment nodes, and has 0.0.0.0 assigned to the head node of the head segment thereby to provide no indication of the head node of the head segment, with an instruction requesting that the end node be selected.

The primary-path-provision-request analyzing unit 102 finds that the head node of the head segment is provided with 0.0.0.0 (step 1103). Upon receipt of the primary-path-provision request from the communication control unit 101, the segment position information deriving unit 103 that obtains the information about nodes constituting the primary path from the primary-path-provision request identifies the local node as the head node of a segment because the local node is the head-end node of the primary path (step 1105). The segment position information deriving unit 103 further selects on its own the end node of the segment of interest from nodes situated downstream on the primary path (step 1106). In this example, the node 204 is selected as the end node of the segment of interest.

After this, the segment position information updating unit 104 sets the end node of the current segment and the head node of the next segment (represented by 0.0.0.0 or the like since it has yet to be identified) in the primary-path-provision requesting message (step 1108). A route of a backup path is then computed (step 1109). Further, control messages for the backup path and the primary-path-provision requesting message inclusive of a backup-path-provision request are transmitted (step 1110).

At downstream nodes other than the head-end node of the primary path, the primary-path-provision-request analyzing unit 102 finds that 0.0.0.0 is assigned to the head node of the end segment in the information about segment position contained in the received primary-path-provision requesting message (step 1103). In response, the segment position information deriving unit 103 compares the end node of a preceding segment with the local node to determine whether the local node is the head node of a segment (step 1105). The rule that the end node of the preceding segment is the same as the head node of the next segment may be applied, resulting in the node 204 being selected as the head node of the second segment. The node 207 is then selected as the end node of the current segment from nodes situated downstream on the primary path (step 1106).

After this, the segment position information updating unit 104 sets the end node of the current segment and the head node of the next segment (represented by 0.0.0.0 or the like since it has yet to be identified) in the primary-path-provision requesting message (step 1108).

Since the node 207 is the tail-end node of the primary path, no provision of a backup path is performed.

In this manner, a backup path is set up, connecting between the head node and end node of a segment and bypassing the segment. This reduces the number of backup paths and lowers the consumption of network resources used by backup paths. If a primary path is comprised of 50 nodes, for example, the conventional link-failure-recovery structure requires 49 backup paths. With the division of the primary path into five segments, the invention reduces the number of backup paths to five, thereby avoiding excess consumption of network resources and preventing an unwanted increase in traffic.

The communication control unit 101, the primary-path-provision-request analyzing unit 102, the segment position information deriving unit 103, and the segment position information updating unit 104 correspond to a primary-path-provision-requesting-message transmitting unit, and the primary-path-provision-request analyzing unit 102, the segment position information deriving unit 103, the segment position information updating unit 104, and the failure recovery control unit 105 correspond to a backup-path setting unit.

Further, the present invention is not limited to these embodiments, but various variations and modifications may be made without departing from the scope of the present invention.

The present application is based on Japanese priority application No. 2004-083272 filed on Mar. 22, 2004, with the Japanese Patent Office, the entire contents of which are hereby incorporated by reference.

What is claimed is:

1. A method of setting up a backup path for a primary path on a network, comprising the steps of:
    grouping nodes constituting the primary path into segments each including a plurality of nodes, said segments corresponding to respective portions of the primary path;
    transmitting information about segment position by a primary-path-provision requesting message, said information about segment position including information indicative of head nodes and end nodes of the respective segments corresponding to the respective portions of the primary path;
    identifying the head nodes and end nodes of the respective segments based on the transmitted information; and
    setting a backup path connecting between an identified head node and an identified end node separately for each segment thereby to set backup paths for the respective segments, such that each of the backup paths is set up for a corresponding one of the respective portions of the primary path.

2. The method as claimed in claim 1, wherein said step of setting a backup path includes the steps of:
    supplying, from an upper-order system to a head-end node of the primary path, a primary-path-provision request including at least one of information about a position of the head node of each of the segments and information about a position of the end node of each of the segments;
    transmitting, from the head-end node to nodes situated downstream on the primary path, the primary-path-provision requesting message including said at least one of information about the position of the head node of each of the segments and information about the position of the end node of each of the segments; and
    setting the backup path connecting between the head node and end node of each of the segments separately for each segment.

3. The method as claimed in claim 1, wherein said step of setting a backup path includes the steps of:
    transmitting, from a head-end node of the primary path to nodes situated downstream on the primary path, the primary-path-provision requesting message including at least one of information about a position of an end node of a local segment and information about a position of a head node of a next segment;
    transmitting, from the head node of each of the segments to nodes situated downstream on the primary path, the primary-path-provision requesting message including at least one of information about a position of an end node of a local segment and information about a position of a head node of a next segment; and
    setting the backup path connecting between the head node and end node of each of the segments separately for each segment.

4. An apparatus for serving as a given node in a network, comprising:
    a primary-path-provision-requesting-message transmitting unit configured to respond, to a primary-path-provision request supplied from an upper-order system indicating segments into which nodes constituting a primary path are grouped, by generating a primary-path-provision requesting message including at least one of information about positions of head nodes of the respective segments and information about positions of end nodes of the respective segments for transmission to nodes situated downstream on the primary path, said segments corresponding to respective portions of the primary path; and a backup-path setting unit configured to set up a backup path connecting between said given node and an end node of a given one of the segments starting from said given node upon identifying the given node as a head node of the given one of the segments based on the supplied primary-path-provision request, such that the backup path is set up as one of backup paths set up for the respective portions of the primary path.

5. An apparatus for serving as a given node in a network, comprising:

a primary-path-provision-requesting-message transmitting unit configured to respond, to a primary-path-provision request supplied from an upper-order system indicating segments into which nodes constituting a primary path are grouped, by generating a primary-path-provision requesting message including at least one of information about a position of an end node of a segment starting from said given node and information about a position of a head node of a next segment for transmission to nodes situated downstream on the primary path, said segments corresponding to respective portions of the primary path; and a backup-path setting unit configured to set up a backup path connecting between said given node and the end node of the segment starting from said given node upon identifying the given node as a head node of a given one of the segments based on the supplied primary-path-provision request, such that the backup path is set up as one of backup paths set up for the respective portions of the primary path.

6. An apparatus for serving as a given node in a network, comprising:

a unit configured to receive a primary-path-provision requesting message supplied from a node situated upstream including at least one of information about positions of head nodes of respective segments and information about positions of end nodes of the respective segments, the respective segments corresponding to respective portions of a primary path; and a backup-path setting unit configured to respond to the received primary-path-provision requesting message by setting up a backup path connecting between said given node and an end node of a segment starting from said given node upon identifying said given node as a head node of a segment, such that the backup path is set up as one of backup paths set up for the respective portions of the primary path.

7. An apparatus for serving as a given node in a network, comprising:

a unit configured to receive a primary-path-provision requesting message supplied from a node situated upstream including at least one of information about a position of an end node of a local segment and information about a position of a head node of a next segment, the local segment and the next segment being part of a plurality of segments corresponding to respective portions of a primary path; and a backup-path setting unit configured to respond to the received primary-path-provision requesting message by setting up a backup path connecting between said given node and the end node of the local segment upon identifying said given node as a head node of the local segment, such that the backup path is set up as one of backup paths set up for the respective portions of the primary path.

* * * * *